United States Patent Office 3,146,082
Patented Aug. 25, 1964

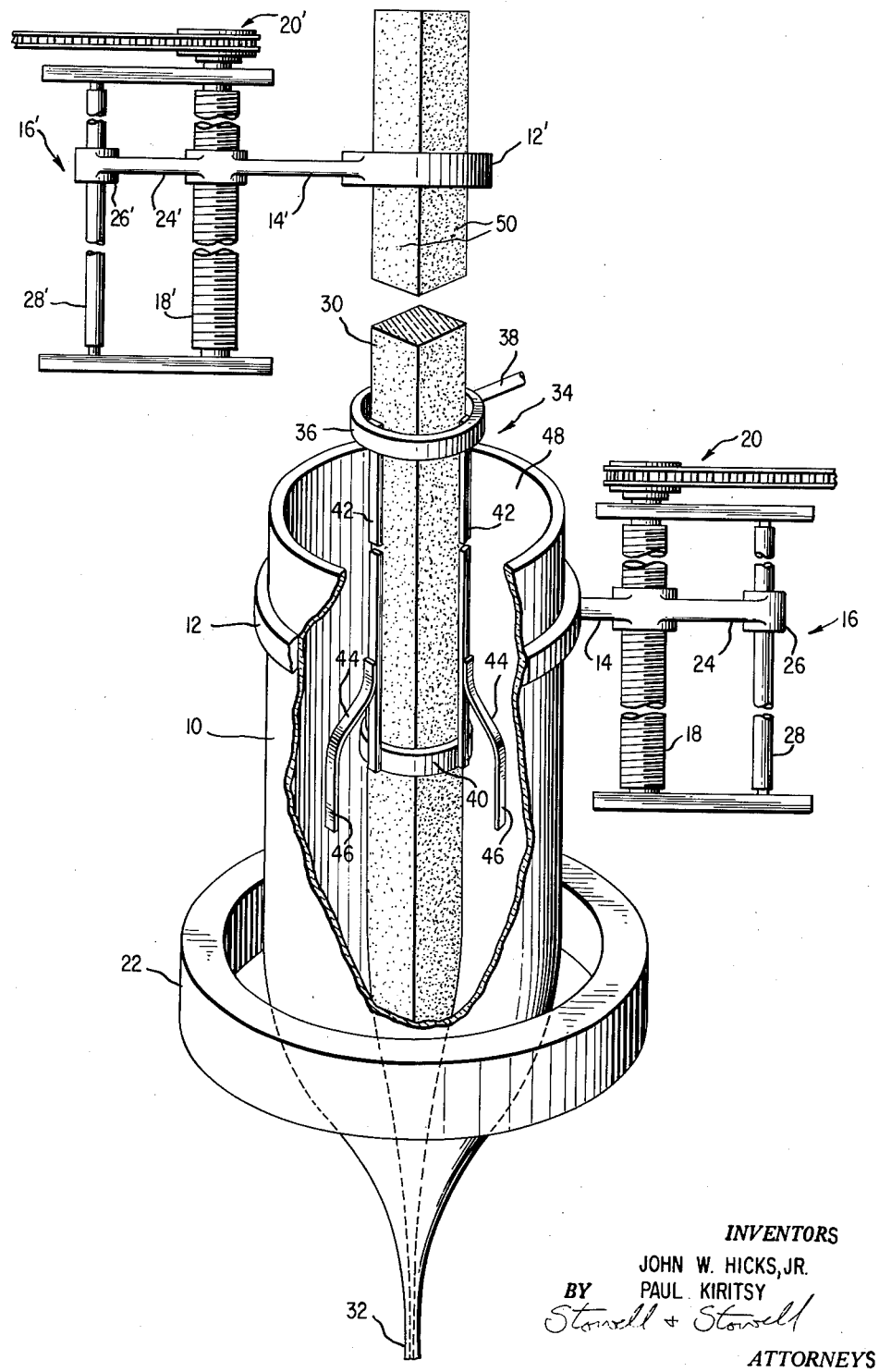

3,146,082
METHOD OF MAKING LIGHT-CONDUCTING FIBERS
John W. Hicks, Jr., Fiskdale, and Paul Kiritsy, Southbridge, Mass., assignors to Mosaic Fabrications, Inc., Southbridge, Mass., a corporation of Massachusetts
Filed Nov. 24, 1961, Ser. No. 154,663
4 Claims. (Cl. 65—3)

This invention relates to an improved method of making light-conducting fibers and, in particular, to a method of making light-conducting glass fibers composed of a glass rod with a coating of glass having a lower index of refraction than the glass rod.

Particular objects of the invention are to provide an economical and highly reproducible method of making light-conducting glass fibers.

Further objects are to provide a method whereby the cross-sectional shape and area of the fibers and the relative cross-sectional areas of the rod and coating may be readily controlled.

These and other objects and advantages of the invention are provided by a method of making a light-conducting glass fiber comprising a glass rod having a coating of glass which comprises providing an eroded matte surface on a glass rod, coating the rod with a flux, centrally supporting the rod for longitudinal movement in a tubular glass member having a lower index of refraction than the rod, heating the tubular member and the rod to a drawing viscosity and drawing the rod and the tubular member from the heating zone.

Fiber optical and fiber electrical devices are generally composed of bundles of relatively small diametered glass fibers of, for example, 5 to 10 microns in diameter. The fibers are conventionally produced by heating, to a drawing temperature, a glass tube surrounding a glass rod and drawing a composite fiber from the heating zone.

In order to provide for high quality image transmission with a minimum of light loss, it is necessary that the surface of the light-transmitting rod be clean and smooth and that the cladding tube, which is composed of a glass of lower index of refraction than the rod, uniformly contacts the surface of the rod. It is further necessary that the zone of contact between the cladding tube and the rod be free of gas pockets or other foreign material. Further, it is desirable that the plural fibers of the bundle be substantially uniform in diameter and that the ratio of rod area to cladding area be relatively uniform.

In the past these conditions have been sought by providing the glass element forming the light-conducting channel with a highly polished, extremely clean surface and by maintaining a light vacuum between the rod and the cladding tube during the drawing operation.

It has been discovered that by providing an eroded matte surface on the glass rod to be clad and coating the glass rod with a suitable flux, it is possible to produce a well-fired, smooth, degassed, burnt-off surface on the rod before it is fused to the tube, whereby light-conducting glass fibers having substantially improved light-transmitting properties may be produced.

Throughout the specification and claims, the terms, "eroded matte surface" means a surface which is chemically etched, mechanically worn or abraded or mechanically worn and chemically etched to remove any polish or roughness therefrom and to provide a smooth, dull finish. Typically, matte surfaces such as are provided by the action of abrasives having particle sizes in the range from about 200 mesh to about 600 mesh are suitable.

The invention will be more particularly described with reference to the accompanying drawings schematically illustrating apparatus which may be used in carrying out the methods of the invention.

Referring to the drawings, 10 generally designates a glass tube having an inside diameter of, for example, about 3 inches. A band 12 is secured adjacent the upper end of the tube 10 which band is secured to the extended end of an arm 14 forming the longitudinally movable member of the tube lowering mechanism 16. The feed mechanism 16 generally includes a lead screw member 18 having one end connected to a suitable gear, or gear and chain drive mechanism which, in turn, is connected to a conventional variable speed control mechanism and prime mover not shown in the drawings, whereby the glass tube 10 may be lowered through the heating zone adjacent the heater element 22 at a predetermined rate. The arm member 14 includes an extension 24 provided with a bearing element 26 which slidably engages a centering post 28 which prevents lateral or rotational movement of the arm 14.

The heater element 22 is preferably of the radiant heating ring type whereby the temperature of the tube 10 in the heating zone may be substantially uniformly maintained, as is more fully described hereinafter.

The assembly includes a second glass member 30, which has a higher index of refraction than the cladding glass tubular member 10. The upper end of the glass member 30 is engaged by a clamping ring 12' which clamping ring is secured to an arm member 14' forming the movable element of the glass rod feeding mechanism generally designated 16'. The glass rod feeding mechanism 16', like feeding mechanism 16, includes a lead screw 18' drivably connected to a suitable prime mover and variable speed drive means through, for example, a gear and chain drive mechanism generally designated 20'. The assembly 16' also includes a guide rod 28', an arm extension 24' and a cylindrical bearing member 26' whereby the glass rod 30 may be progressively lowered through the heating zone defined by the ring heater 22 at a predetermined rate of speed which rate of speed may be different from the rate of lowering of the tube 10 through the heating zone whereby the operator may control the relative areas of the rod and cladding in the composite fiber 32 drawn from the tube and rod.

It is important that the glass rod or member 30 be substantially centered within the tubular member 10. Centering of the rod 30 is assisted by a guide member generally designated 34. The guide member includes a ring element 36 secured by arm member 38 against longitudinal movement. The ring member 36 is connected to a cooperating ring 40 by a plurality of generally vertically extending rod members 42. The pair of rings 36 and 40 and the rod members 42 relatively snugly engage the surface of the rod 30; however, these members permit the rod 30 to be moved longitudinally with respect thereto. Each of the rod members 42 has secured to an outer wall thereof a generally downwardly and laterally extending resilient element 44 having surfaces 46 which engage the inner wall 48 of the tubular member 10 and maintain the rod 30 substantially centered therein even though the inner diameter of the tube 10 may not be exactly the same throughout its length.

The surface 50 of the glass member 30 is provided with an eroded matte finish by chemically etching, mechanically wearing or abrading or mechanically wearing and chemically etching the surface to remove any polish or roughness therefrom and to provide a smooth, dull surface on the member.

The process for obtaining the eroded matte surface on the glass member 30 is not critical and the selected process will depend to some extent on the composition of glass employed in the rod 30. For example, if the glass rod is one of the lanthanum silicate glasses, the sawed slab may be chemically etched with 0.1 N nitric acid to provide the eroded matte surface. A suitable lanthanum silicate glass for the rod 30 may comprise (percent by weight):

| | |
|---|---|
| $SiO_2$—12% | $B_2O_3$—18% |
| BaO—47% | $ThO_2$—10% |
| Iron and aluminum oxides—3% | $La_2O_3$—10% |

Flint and barium dense flint glasses may be eroded by etching in a 4% hydrofluoric acid solution. The glass members 30 may also be provided with satisfactory eroded matte surfaces by grinding the surfaces with an abrasive such a silicon carbide having particle sizes in the range of from about 200 mesh to about 600 mesh. Where the abrasive particles employed in the grinding are larger than, for example, 300 mesh, the ground surface should be lightly etched to smooth out the bottoms of the pits formed during the grinding operation. Where finer abrasives are employed in the grinding operation so that the pits formed in grinding are only a few thousandths of an inch deep, an acid etch is unnecessary.

The following are flint and barium dense flint glass compositions suitable for the high index of refraction glass rods 30 (percent by weight).

Flint:

| | |
|---|---|
| $SiO_2$—44.9% | $K_2O$—8% |
| $Na_2O$—.5% | PbO—46.6% |

Barium dense flint:

| | |
|---|---|
| $SiO_2$—43.3% | PbO—32.6% |
| $Na_2O$—.7% | BaO—10.8% |
| $K_2O$—7.5% | ZnO—5.1% |

In the illustrated form of the invention, the glass member is square in cross section; however, the cross-sectional shape of the rod is not critical and the rod may be round, hexagonal or the like and only when it is desired to directly draw a fiber having a light conducting channel that is other than circular is it necessary to employ, for example, square or hexagonal rods.

The rod 30 after being provided with the eroded matte surface is coated with a suitable low melting flux which will slightly diffuse into the glass rod and aid in melting the surface thereof; however, the flux should not devitrify the base glass. A suitable flux for high lead silicate rods, for example, of the compositions given above, may comprise sodium borate or boric oxide and 70% by weight or greater of lead oxide in a cellulose nitrate vehicle. It is desirable that the vehicle have little or no residue and that any residue should burn clean during the application of drawing heat to the glass members.

The aforementioned glass compositions for the rod 30 and the flux may be very satisfactorily employed with a glass tube 10 having the following typical composition (percent by weight):

| | |
|---|---|
| $SiO_2$—73.6% | CaO—5.2% |
| $Na_2O$—16% | MgO—3.6% |
| $K_2O$—0.6% | $Al_2O_3$—1% |

The assembly of glass tube 10 and glass rod 30 are lowered by actuation of the lead screw means 18 and 18' into the heating zone of the ring heater means 22 at a rate such that the tube and rod are heated to a drawing viscosity whereby a composite member 32 may be drawn from the heating zone. The rod and the tube may be lowered at different speeds and the rod is lowered relatively faster than the tubing 10 if the cladding for the rod is to be relatively thin. The rod 30 is lowered at a slower rate if the cladding is to be thicker. Since the rod 30 has a smaller cross-sectional area than the tube 10, it has been found to be easier to maintain a suitable drawing cone if the rod is lowered at a rate relative to the longitudinal movement of the tube 10 such that the original rod area×the rod speed=the original inner area of the tube×the tube speed.

If the rod 30 is square in cross-section and the resulting glass fiber is to be cylindrical in cross-section, it is desirable that the viscosity of the rod in the drawing zone be substantially less than the viscosity of the tube 10. The necesary differences in the viscosity of the tube 10 and the rod 30 in the drawing zone may be provided by a suitable choice of glasses for rod and tube and the relative viscosities are influenced to some extent by the balance of radiant temperature to the surrounding air temperature. Also, as is known in the art, some glasses have steeper viscosity-temperature curves than others whereby it is possible that at one temperature the rod 30 will be more viscous than the tube 10, and at another temperature the tube may be more viscous than the rod, at temperatures within the range of drawability. It will also be appreciated that when the light-conducting channel formed by the rod 30 is to be square or hexagonal in cross-section, it is necessary to maintain the drawing viscosity of the rod substantially greater than the drawing viscosity of the cladding tube 10 so that during the drawing operation, while the cross-sections of the rod and the tube are substantially reduced in area, the cross-sectional configuration of the rod remains substantially the same.

Further control of the relative viscosities of the tube 10 and the rod 30 during drawing may be provided by painting the external surface of the tube 10 with a relatively opaque low-melting frit which reduces the radiant heat transfer from the ring burner 22 to the rod, thus maintaining the rod at a relatively lower temperature than the tube. Also, it will be appreciated that when, at the selected running speed, the viscosity of the rod 30 is relatively too low, the viscosity of the rod may be increased at the drawing zone by increasing the lowering speed of both the tube and the rod. By increasing the feed rate of both the tube and the rod, the rod will be maintained at a relatively cooler temperature since it is more massive and heats more slowly than the tube 10 which is also positioned closer to the source of radiant energy.

A suitable relatively opaque coating may comprise:

| | Gm. |
|---|---|
| Rubidium carbonate—$Rb_2CO_3$ | 40 |
| Silica—$SiO_2$ | 61.6 |
| Sodium borate, anhydrous—$Na_2B_4O_7$ | 60 |
| Boric anhydride—$B_2O_3$ | 40 |
| Lithium manganite—$LiMnO_3$ | 3.0 |
| Lithium cobaltite—$LiCoO_2$ | 7.0 |
| Lithium chromate—$LiCrO_4$ | 3.0 |

*Example*

A glass tube 2 inches in diameter and a wall thickness of .070 inch consisting of $SiO_2$ 73.6% by weight, $Na_2O$ 16% by weight, $K_2O$ .6% by weight, CaO 5.2% by weight, MgO 3.6% by weight, and $Al_2O_3$ 1% by weight, was supported in an apparatus as illustrated in the drawings.

Centrally positioned within the glass tube was a glass rod 1⅛ inch square in cross-section consisting of $SiO_2$ 44.6% by weight, $Na_2O$ .5% by weight, $K_2O$ .8% by weight, and PbO 46.6% by weight. The surface of the rod was ground with 302 mesh silicon carbide and etched in a 4% hydrofluoric acid solution for about 60 minutes.

The rod was then coated with a frit consisting of lead oxide 90% by weight and sodium borate 10% by weight.

The ring heater was energized and the tube was lowered through the heating zone at about ⅛ inch per minute and the rod was lowered through the heating zone at about ½ inch per minute. A clad optical quality fiber about .010 inch in diameter was drawn from the heating zone at about 600 feet per minute.

From the foregoing description, it will be seen that by suitable choice of glass materials, fluxes, opaque paints, temperatures and running speeds, it is possible to produce a very great variety of clad optical fibers without polishing the bar member forming the light channel and without applying vacuum to the zone between the rod and the cladding tube.

We claim:
1. A method of making a light-conducting glass fiber comprising a glass rod having an intimate glass coating comprising producing an eroded matte surface on a glass rod, coating said glass rod with a flux, centrally supporting said rod for longitudinal movement in a tubular glass member, heating said tubular member and said rod to a drawing viscosity and drawing said rod and said tubular member from the heating zone.

2. A method of making a light-conducting glass fiber comprising a glass rod having an intimate glass coating comprising producing an eroded matte surface on a glass rod, coating said glass rod with a flux, centrally supporting said rod for longitudinal movement in a tubular glass member, heating said tubular member and said rod to a drawing viscosity and drawing said rod and said tubular member from the heating zone while advancing said rod through the heating zone at a greater longitudinal speed than that of the tubular member.

3. A method of making a light-conducting glass fiber comprising a glass rod having an intimate glass coating comprising providing an eroded matte surface on a glass rod, coating said rod with a flux, centrally supporting said rod for longitudinal movement in a tubular glass member having a lower index of refraction than the rod, supporting said tubular glass member for longitudinal movement independent of the movement of the rod, heating said tubular member and said rod to a drawing viscosity and drawing said rod and said tubular member from the heating zone.

4. A method of making a light-conducting glass fiber comprising a glass rod having an intimate glass coating comprising providing an eroded matte surface on a glass rod, coating said rod with a flux, centrally supporting said rod for longitudinal movement in a tubular glass member having a lower index of refraction than the rod, supporting said tubular glass member for longitudinal movement independent of the movement of the rod, heating said tubular member and said rod to a drawing viscosity and drawing said rod and said tubular member from the heating zone while advancing said rod through the heating zone at a greater longitudinal speed than the tubular member.

References Cited in the file of this patent
UNITED STATES PATENTS

| | | |
|---|---|---|
| 2,202,714 | Nash | May 28, 1940 |
| 2,313,296 | Lamesch | Mar. 9, 1943 |
| 2,643,020 | Dalton | June 23, 1953 |
| 2,980,957 | Hicks | Apr. 25, 1961 |
| 2,992,517 | Hicks | July 18, 1961 |
| 3,015,133 | Nichols | Jan. 2, 1962 |